United States Patent Office 3,294,568
Patented Dec. 27, 1966

3,294,568
PROCESS FOR THE PRODUCTION OF
PLAIN BEARINGS
Bernhard Gossmann, Laucherthal, Hohenzollern, Germany, assignor to Furstlich Hohenzollernsche Huttenverwaltung Laucherthal, Laucherthal, Hohenzollern, Germany, a company of Germany
No Drawing. Filed Feb. 8, 1963, Ser. No. 257,068
Claims priority, application Germany, Feb. 9, 1962, F 35,990
5 Claims. (Cl. 117—8)

This invention relates to a process of producing plain bearings with a sliding film of synthetic resin and has for its object the production of a bearing which is almost free of maintenance.

With such a plain bearing, the frictional heat generated must be only so high that it can be removed by the surrounding air, since there is no cooling by a lubricant. Therefore the plain bearing should contain a sliding layer with a low coefficient of friction on steel etc., and at the same time this layer should have good heat conductivity. It is known that, among synthetic resins which are suitable for bearings, polytetrafluoroethylene (PTFE) has a very low coefficient of friction on steel. Its heat conductivity is however low. Accordingly plain bearings with a sliding layer of PTFE have been produced from a foil of PTFE roughened on the back side by etching and attached by means of an epoxide resin to a support-body. Alternatively the PTFE in the form of a sheet or powder has been applied under pressure to a layer of sintered metal in order to obtain a mechanical anchoring of the PTFE to the sintered body. Attempts have also been made to apply a complete layer of PTFE on the support-body, without substantial commercial success.

Moreover it is known to apply a film of synthetic resin of hardenable synthetic resins, e.g. epoxide resins on the support-body by brushing, spraying or dipping and to load this film of synthetic resin with mica in order to improve the adhesion of the resin layer to the surface of the support-body, or to load it with metal powder, by which an improved sliding and heat conductivity is achieved. These bearings need, however, a lubricant, if only in the form of emergency lubrication since the generated frictional heat is still too high for an unattended bearing.

The process for producing plain bearings with a sliding film of synthetic resin applied by brushing, spraying or dipping or by sintering on a metallic support-body according to the invention consists in that a film of 30–80% by weight of powdered polytetrafluorethylene and the remainder of epoxide resin or the like is applied on the support-body, which film after thermohardening is mechanically treated e.g. by turning or grinding for cutting the grains.

This addition of PTFE reduces the coefficient of friction so much that in spite of the lowered heat conductivity, reduced from 0.7 to 0.2 kilogram-calories per meter hour and degree centigrade, the heat of friction generated can be removed by radiation.

Bearings of this kind have such a low coefficient of friction in contact with steel that they can be used as unattended bearings, although they have no integral layer of PTFE. Over the known plain bearings with PTFE in the sliding layer the process according to the invention reduces considerably the expense for PTFE as well as the cost of manufacture because the bearings can be produced without an etching bath and without applying an intermediate layer of sintered metal. Moreover the process according to the invention not only permits the production of bearings and bushings from strips by bending and rolling but also the coating of any formed bodies on their bearing surfaces with this sliding layer.

Tests made with a testing machine (type Schenk) have shown that bearings produced according to the invention have a longer running time than normal bearings made exclusively of PTFE and bearings with sliding layers of other synthetic resins, and have the same running time as bearings with a layer of PTFE applied to sintered bronze.

In the manufacture of the bearings of the invention, a spreadable mass of epoxide resin, optionally diluted with a solvent, is thoroughly mixed with PTFE powder and is applied on the metallic support-body in one or more layers by brushing, spraying or dipping. The PTFE present in a proportion of 30–80% by weight fills in the mass of epoxide resin a volume of about 20–70% by volume. The applied sliding film is hardened at temperatures of 200–250° C. and is finished by turning or grinding in order to cut the grains of PTFE surrounded by the epoxide resin. The grain size of the PTFE should be 20–70$\mu$, the thickness of the layers being chosen in the range of 0.1–1.0 mm.

I claim:

1. A method of making plain bearings having a metallic base and a layer of bearing material which method comprises mixing a polytetrafluoroethylene powder having a particle size in the range between 20 and 70 microns with a thermosetting resin to form a polymeric mixture, the amount of polytetrafluoroethylene in the mixture being 30% to 80% by weight, coating said polymeric mixture on said metallic base to form a layer having a thickness in the range of 0.1 to 1 millimeter, heat curing said polymeric mixture to form the layer of bearing material, and machining said layer of bearing material to expose the particles of polytetrafluoroethylene.

2. A method according to claim 1 wherein said thermosetting resin is an epoxy resin and said heat curing is conducted at a temperature in the range between 200° and 250° C.

3. A method according to claim 1 wherein said polymeric mixture is diluted with a solvent prior to its application to the metallic base.

4. A plain bearing comprising a metallic base on which there is coated a layer of bearing material consisting of 30% to 80% by weight of a polytetrafluoroethylene powder having a particle size in the range of 20 to 70 microns embedded in a heat cured thermosetting resinous matrix, said layer of bearing material having a thickness in the range of 0.1 to 1 millimeter and said particles of polytetrafluoroethylene being exposed on the surface thereof.

5. A plain bearing according to claim 4 wherein said thermosetting resinous matrix is a heat cured epoxy resin.

References Cited by the Examiner
UNITED STATES PATENTS

| 2,844,557 | 7/1958 | Welch | 117—132 |
| 2,888,364 | 5/1959 | Bauer | 117—132 |
| 2,976,257 | 3/1961 | Dawe | 117—132 |
| 2,998,397 | 8/1961 | Riesing | 308—238 X |
| 3,151,015 | 9/1964 | Griffith | 308—238 X |

ALFRED L. LEAVITT, *Primary Examiner.*

RALPH S. KENDALL, *Examiner.*